United States Patent
Jang

(10) Patent No.: US 6,834,545 B2
(45) Date of Patent: Dec. 28, 2004

(54) STRUCTURE FOR INSTALLING A FUEL LEVEL SENSOR IN A FUEL TANK FOR AUTOMOBILES

(75) Inventor: Doo-Yeek Jang, Gwangju (KR)

(73) Assignee: Kia Motors Corporation, Seoul (KR)

( * ) Notice: Subject to any disclaimer, the term of this patent is extended or adjusted under 35 U.S.C. 154(b) by 2 days.

(21) Appl. No.: 09/799,081

(22) Filed: Mar. 6, 2001

(65) Prior Publication Data

US 2002/0029631 A1 Mar. 14, 2002

(30) Foreign Application Priority Data

Aug. 11, 2000  (KR) .......................... 2000-46527

(51) Int. Cl.$^7$ ............................. G01F 23/00
(52) U.S. Cl. .................. 73/290 R; 73/304 R
(58) Field of Search .................. 73/290 R, 304 R, 73/290 V, 305, 118.1; 137/393, 395, 396, 397, 398, 399

(56) References Cited

U.S. PATENT DOCUMENTS

| | | | | |
|---|---|---|---|---|
| 695,007 A | * | 3/1902 | Strutt et al. .................. 73/317 |
| 1,132,833 A | * | 3/1915 | Coseo ...................... 137/398 |
| 1,357,986 A | * | 11/1920 | Jerdone, Jr. ................ 137/390 |
| 1,357,988 A | * | 11/1920 | Jerdone, Jr. ................ 137/390 |
| 1,613,028 A | * | 1/1927 | Fischer ..................... 137/390 |
| 1,714,250 A | * | 5/1929 | Stahl ........................ 137/544 |
| 1,904,793 A | * | 4/1933 | Lavoie ...................... 137/390 |
| 2,191,700 A | * | 2/1940 | Stetson ..................... 137/270 |
| 2,468,676 A | * | 4/1949 | Liben ........................ 340/622 |
| 3,326,264 A | * | 6/1967 | Howard ..................... 137/398 |
| 4,051,726 A | * | 10/1977 | Hastbacka ................. 73/290 R |
| 4,121,457 A | * | 10/1978 | Yoshida et al. .............. 73/291 |
| 4,338,907 A | * | 7/1982 | Lindbeck ................... 123/523 |
| 4,454,759 A | * | 6/1984 | Pirkle ....................... 116/276 |
| 4,591,839 A | * | 5/1986 | Charboneau et al. ....... 340/620 |
| 4,854,406 A | * | 8/1989 | Appleton et al. ........... 177/139 |
| 5,789,665 A | * | 8/1998 | Voelker et al. ............ 73/53.05 |
| 5,808,187 A | * | 9/1998 | Gooden et al. ............ 73/118.1 |
| 6,223,765 B1 | * | 5/2001 | Small et al. ................ 137/312 |
| 6,538,261 B1 | * | 3/2003 | McConnel et al. ......... 250/577 |
| 6,615,656 B1 | * | 9/2003 | Breed et al. ............. 73/290 R |

FOREIGN PATENT DOCUMENTS

JP          05312621 A  * 11/1993  ............... 73/290 R

OTHER PUBLICATIONS

Merriam–Webster's Collegiate Dictionary, 10th edition, 1998 no month, p. 811.*

* cited by examiner

Primary Examiner—Michael Cygan
(74) Attorney, Agent, or Firm—Finnegan, Henderson, Farabow, Garrett, & Dunner L.L.P.

(57) ABSTRACT

Structure for installing a fuel level sensor in a fuel tank for automobiles, which can be applied as a common use regardless of the shape of the fuel tank and the model of a car and can prevent malfunctions of a warning light of the fuel level sensor caused by abrupt braking, abrupt accelerating, and cornering is disclosed. The structure is comprising: a post fixed upright on a drain plug of a fuel tank by a screw fit; a fuel level sensor that is installed on the end portion of the post.

8 Claims, 3 Drawing Sheets

<Prior Art>

<Prior Art>

STRUCTURE FOR INSTALLING A FUEL LEVEL SENSOR IN A FUEL TANK FOR AUTOMOBILES

TECHNICAL FIELD

The present invention relates to a structure for a fuel tank for automobiles, more particularly, a structure for installing a thermistor as a fuel level sensor for detecting the amount of fuel in a fuel tank, which can be applied as a common use regardless of the shape of the fuel tank and the model of a car and can prevent malfunctions of a warning light of a fuel level sensor caused by abrupt braking, abrupt accelerating, and cornering.

BACKGROUND ART

As shown in FIG. 1 and FIG. 2, a general fuel tank comprises a fuel gauge unit sensor 6 having a variable resister plate VR2 and a float 3 installed on one end of a rod and the other end of the rod is installed on the variable resister plate VR2 pivotally.

The operation of the fuel gauge having above structure is as follows.

The float 3 and the rod move pivotally with respect to the level of fuel in fuel tank 1 by the buoyancy, so the resistance of the variable resister plate VR2 varies according to the displacement of the float 3 and the rod.

Therefore, a driver knows the amount of the remaining fuel in the fuel tank 1 from the indicator of the fuel gauge 7 operated by a voltage.

However, because it is possible that a driver is confused by the breakdown of the fuel gauge unit and the float when depending on only the fuel gauge unit, it further comprises a fuel level sensor 4 for alarming a driver when amount of fuel in the fuel tank is less than a predetermined level.

The fuel level sensor 4 comprises a thermistor VR1 installed on one end of a post 5 connected with the fuel gauge unit body 6.

When fuel level is over a predetermined level, because the thermistor VR1 is immersed in the fuel, the resistance has high value, so a warning light 8 is not turned on. Whereas the warning light 8 is turned on in case the thermistor VR1 comes out of the fuel when the fuel level is below a predetermined level, because the resistance has low value.

However the shape of the fuel tank is different according to a design of a car, the fuel gauge unit and the fuel level sensor having above structure must be newly designed.

Moreover, there is a problem in that the position and the height of the fuel level sensor must be changed according to the capacity of the fuel tank and a fuel consumption of each design of a car.

Also, it is possible that the warning light works badly when a driver puts on a brake or accelerates a car abruptly and corners a car. That is because the position of the fuel level sensor is nearer to base of the fuel tank than that of the fuel gauge unit in above structure, so the fuel level sensor is immersed and comes out of the fuel according to the slopping of the fuel from side to side.

DISCLOSURE OF THE INVENTION

It is an object of the present invention to provide a structure for installing a fuel level sensor in a fuel tank for automobiles, which can be applied as a common use regardless of the shape of the fuel tank and the model of a car and can prevent malfunctions of a warning light of the fuel level sensor caused by abrupt braking, abrupt accelerating, and cornering.

According to the aspect of the above object, there is provided a structure for installing a fuel level sensor in a fuel tank for automobiles, the structure comprising:
a post fixed upright on a drain plug of a fuel tank by a screw fit; a fuel level sensor that is installed on the end portion of the post.

BEST MODE FOR CARRYING OUT THE INVENTION

Figure 1:
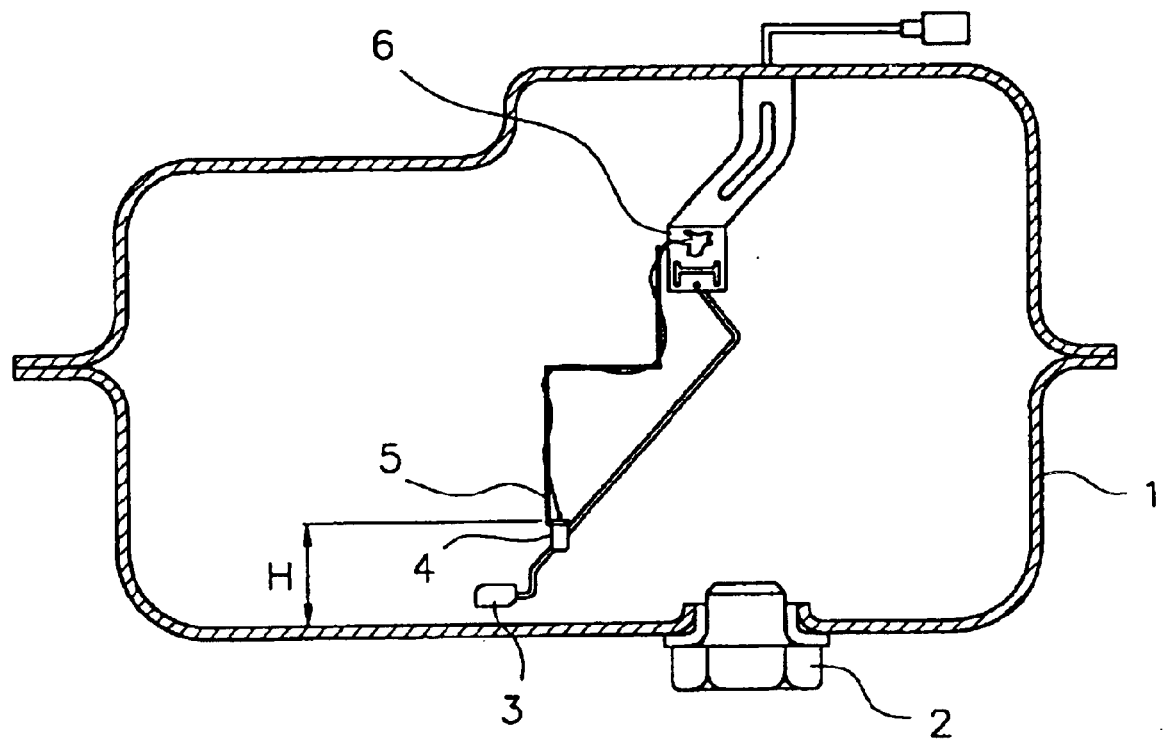
FIG. 1 is a section view of a fuel tank of an automobile showing an installing structure for a fuel level sensor of prior art.
Figure 2:
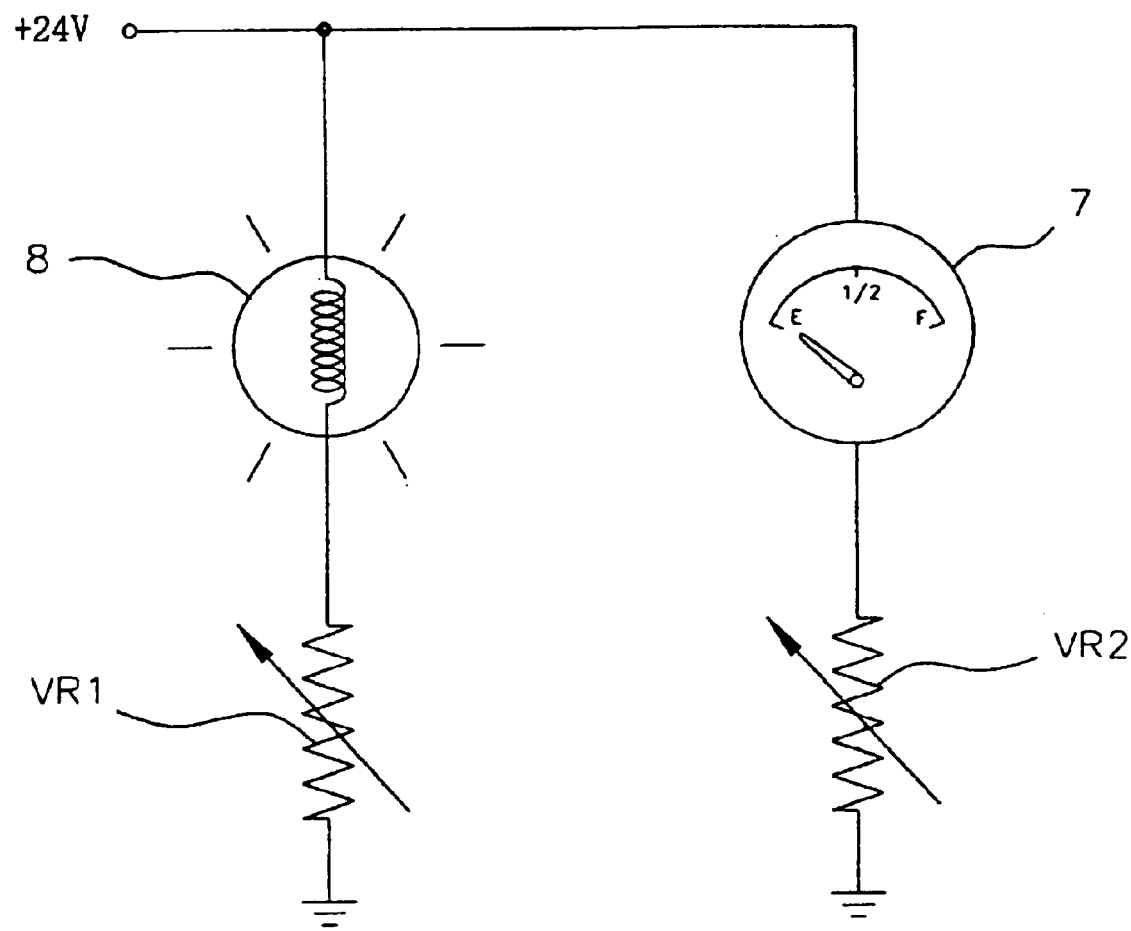
FIG. 2 is a circuit diagram showing a connection of a fuel gauge and a warning light operated by a fuel level sensor of prior art.

The embodiment of the structure for installing a fuel sensor in a fuel tank for automobiles of the present invention will be described with reference to the drawing.

Figure 3:
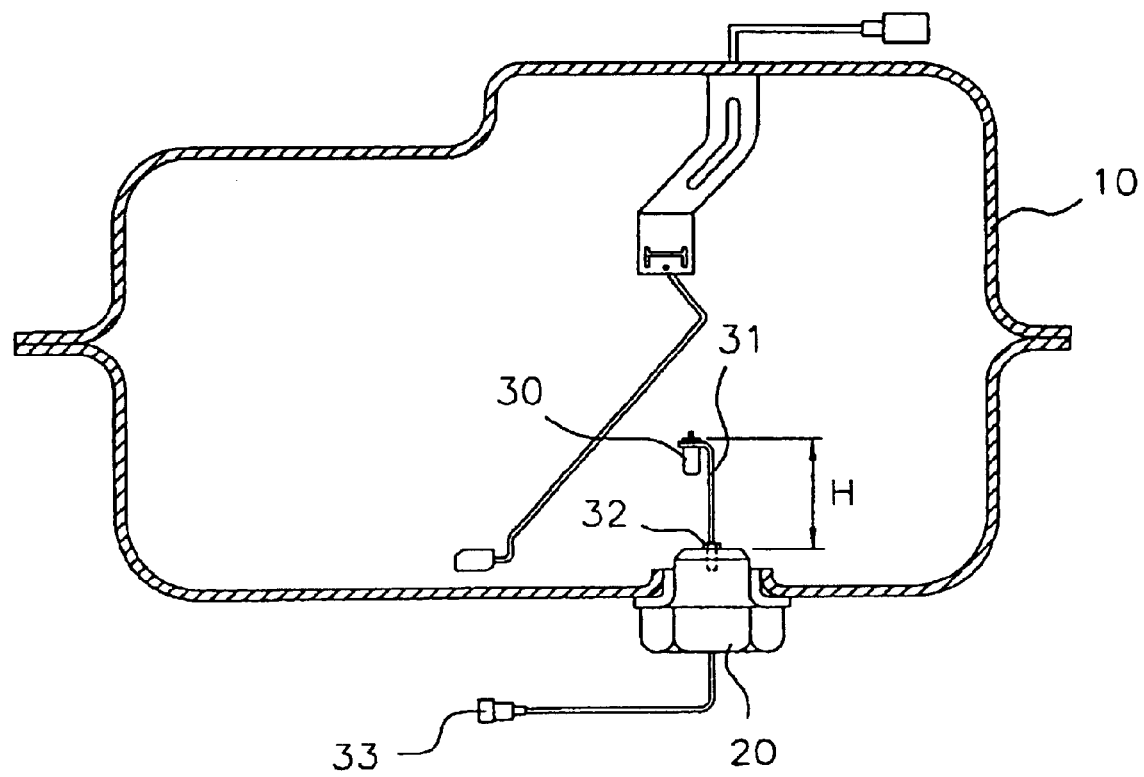
FIG. 3 is a section view of a fuel tank of an automobile showing an installing structure for a fuel level sensor of the present invention.

As shown in FIG. 3, the structure of a fuel tank 10 comprises a post 31 fixed upright on a drain plug 20 of the fuel tank 10 by a screw fit and a fuel level sensor 30 installed on the end portion of the post 31.

The drain plug 20 is installed in the fuel tank 10 for removing fuel containing impurities.

In the inner side of the drain plug 20, a thread is formed and on one end of the post 31, a screw portion is formed, so the post 31 is fixed on the inner side of the drain plug 20 with a screw fit.

The fuel level sensor 30 is installed on the opposite end of the post 31, and connected to a warning light (not shown) and connector 33.

On the screw portion of the post 31, a nut 32 is further comprised for setting a proper height "H" from the drain plug 20 and attaching the post 31 to the drain plug 20.

Therefore, it is not necessary to design new post 31 in case of applying on a fuel tank having different shape to set a proper height.

Industrial Applicability

As described above, the structure for installing a fuel level sensor in a fuel tank for automobiles of the present invention can be applied as a common use regardless of the shape of the fuel tank and the model of a car because the height of the post can be regulated, and can prevent malfunctions of a warning light of the fuel level sensor caused by abrupt braking, abrupt accelerating, and cornering.

What is claimed is:

1. A structure of a fuel level sensor in a fuel tank of an automobile, comprising:
   a drain plug for draining fuel in the fuel tank of the automobile, disposed in a bottom wall of the fuel tank;
   a solid post having a first end portion and a second end portion, the post being fixed upright on the drain plug with the first end portion;
   a nut disposed proximate to the first end portion of the post against the drain plug; and
   a fuel level sensor fixedly attached only to the second end portion of said post, wherein the first end portion of the post includes a threaded portion and the drain plug includes a threaded bore configured to engage the threaded portion.

2. A structure of a fuel level sensor in a fuel tank of an automobile, comprising:

a drain plug for draining fuel in the fuel tank of the automobile, disposed in a bottom wall of the fuel tank;

a post having a first end portion and a second end portion, the post being fixed upright on the drain plug with the first end portion, a portion of the post being configured to adjust a height of the post; and a fuel level sensor fixedly attached only to the second end portion of said post.

3. The structure of claim 2, wherein the post is fixed to the drain plug by a screw fit.

4. The structure of claim 2, further comprising a nut disposed proximate the first end portion against the drain plug.

5. The structure of claim 2, wherein the post being fixed upright on the drain plug is supported by means consisting of the drain plug.

6. The structure of claim 2, wherein the fuel level sensor includes a thermistor.

7. The structure of claim 2, wherein the first end portion of the post includes a threaded portion and the drain plug includes a threaded bore configured to engage the threaded portion.

8. The structure of claim 7, wherein the threaded portion and the threaded bore constitute the portion of the post being configured to adjust a height of the post.

* * * * *